(12) United States Patent
Mao (10) Patent No.: US 10,447,131 B2
(45) Date of Patent: Oct. 15, 2019

(54) LINEAR VIBRATION MOTOR

(71) Applicant: AAC Technologies Pte. Ltd., Singapore (SG)

(72) Inventor: Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 331 days.

(21) Appl. No.: 15/652,584

(22) Filed: Jul. 18, 2017

(65) Prior Publication Data

US 2018/0297068 A1    Oct. 18, 2018

(30) Foreign Application Priority Data

Apr. 14, 2017 (CN) ..................... 2017 2 0390942 U (51) Int. Cl.
*G01L 3/04* (2006.01)
*H02K 33/00* (2006.01)
*B06B 1/04* (2006.01)
*H02K 33/16* (2006.01)

(52) U.S. Cl.
CPC ............. *H02K 33/00* (2013.01); *B06B 1/045* (2013.01); *H02K 33/16* (2013.01)

(58) Field of Classification Search
CPC .......... B06B 1/045; H02K 5/04; H02K 33/00; H02K 33/02; H02K 33/16
See application file for complete search history.

(56) References Cited

U.S. PATENT DOCUMENTS

| 9,871,432 | B2 * | 1/2018 | Mao | ..................... H02K 33/16 |
| 10,008,894 | B2 * | 6/2018 | Mao | ..................... H02K 1/34 |
| 10,220,412 | B2 * | 3/2019 | Mao | ..................... B06B 1/045 |
| 2009/0267423 | A1 * | 10/2009 | Kajiwara | ............... H02K 33/02 310/36 |
| 2017/0117788 | A1 * | 4/2017 | Hou | ..................... H02K 1/34 |

* cited by examiner

*Primary Examiner* — Mohamad A Musleh
(74) *Attorney, Agent, or Firm* — IPro, PLLC; Na Xu (57) ABSTRACT

A linear vibration motor includes a vibration unit including a first side wall and a second side wall; a housing with an accommodation space for accommodating the vibration unit; a stator unit accommodated in the accommodation space; an elastic piece suspending the vibration unit in the accommodation space. The elastic piece includes a first elastic member and a second elastic member, each of the first and second elastic members including a first spring arm and a second spring arm overlapped across each other. Both the first elastic member and the second elastic member have a connection piece abutting against the vibration unit.

7 Claims, 12 Drawing Sheets

LINEAR VIBRATION MOTOR

FIELD OF THE PRESENT DISCLOSURE

The present disclosure relates to vibration motors, more particularly to a linear vibration motor for generating tactile feedbacks.

DESCRIPTION OF RELATED ART

With the development of electronic technologies, portable consumable electronic products are increasingly popular, such as mobile phone, handheld game console, navigating device or handheld multimedia entertainment equipment, in which a vibration motor is generally used for system feedback, such as call reminder, message reminder, navigation reminder of mobile phone, vibration feedback of game console. To meet the demand of such a wide application, the vibration motor shall have high performance and long life.

In related art, a linear vibration motor comprises a housing with an accommodation space, a vibration unit and a stator unit accommodated in the housing, an elastic piece fixing and suspending the vibration unit in the accommodation space. The stator unit drives the vibration unit to vibrate along a vibration direction. The elastic piece is a U shape, to provide support on the Z-axis direction and resilience on the X direction.

However, the elastic piece of U-shape structure provides bad support on the Z-axis direction when supporting the vibration unit, and the vibration unit has a shift on the Y-axis direction during vibration, thus causing unstable performance of the linear vibration motor.

Therefore it is necessary to provide an improved linear vibration motor for overcoming the above-mentioned disadvantages.

BRIEF DESCRIPTION OF THE DRAWING

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment I

Figure 1:
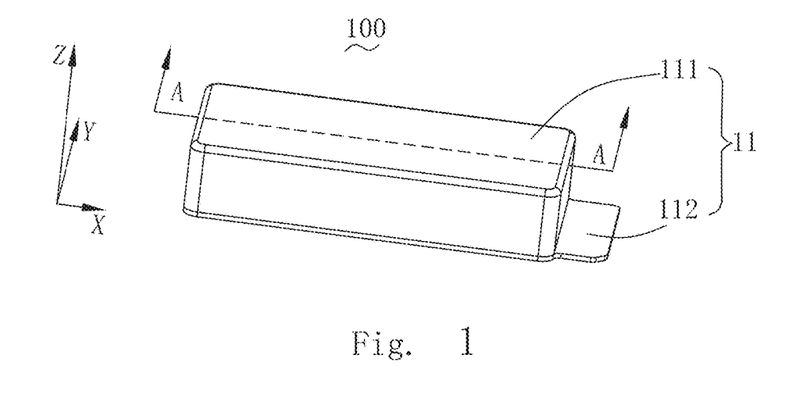
FIG. 1 is an isometric view of a linear vibration motor in accordance with a first exemplary embodiment of the present disclosure.
Figure 2:
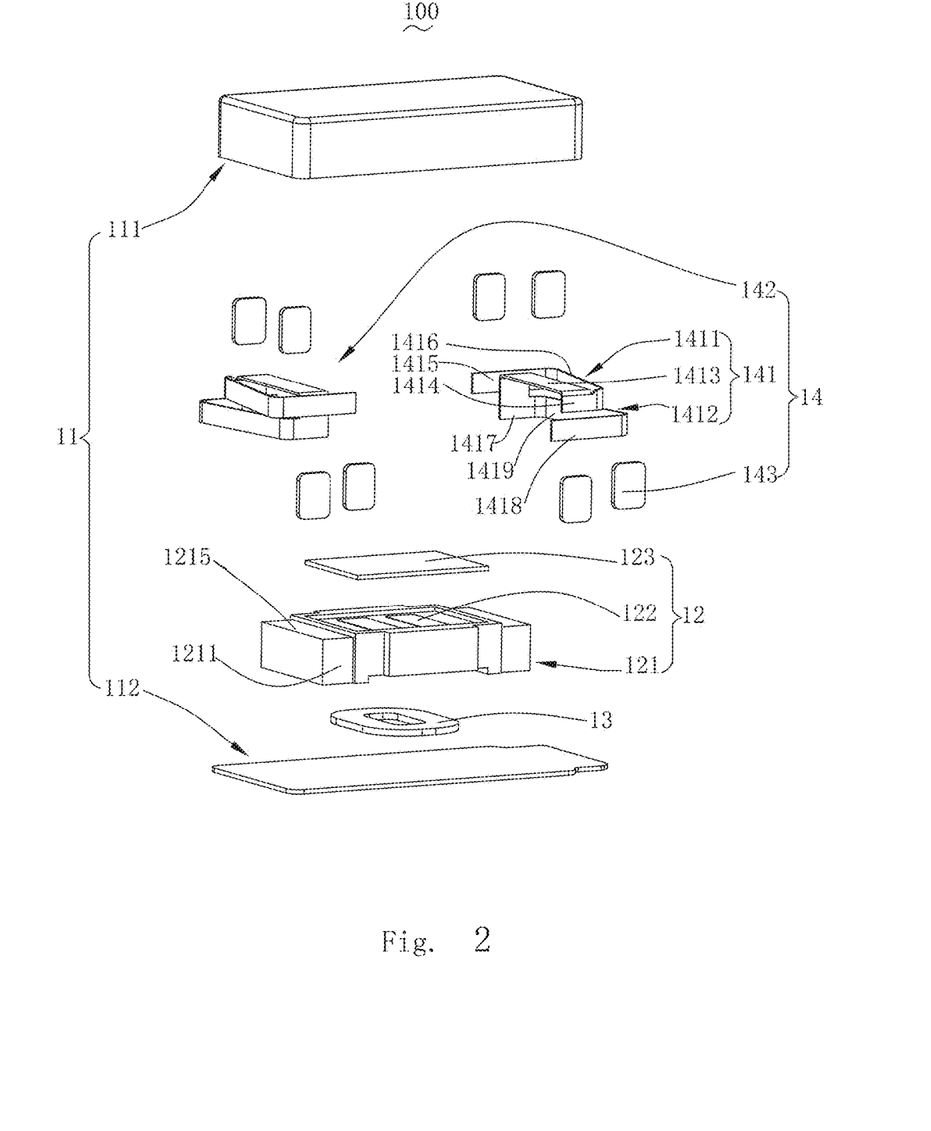
FIG. 2 is an exploded view of the linear vibration motor in FIG. 1.
Figure 3:
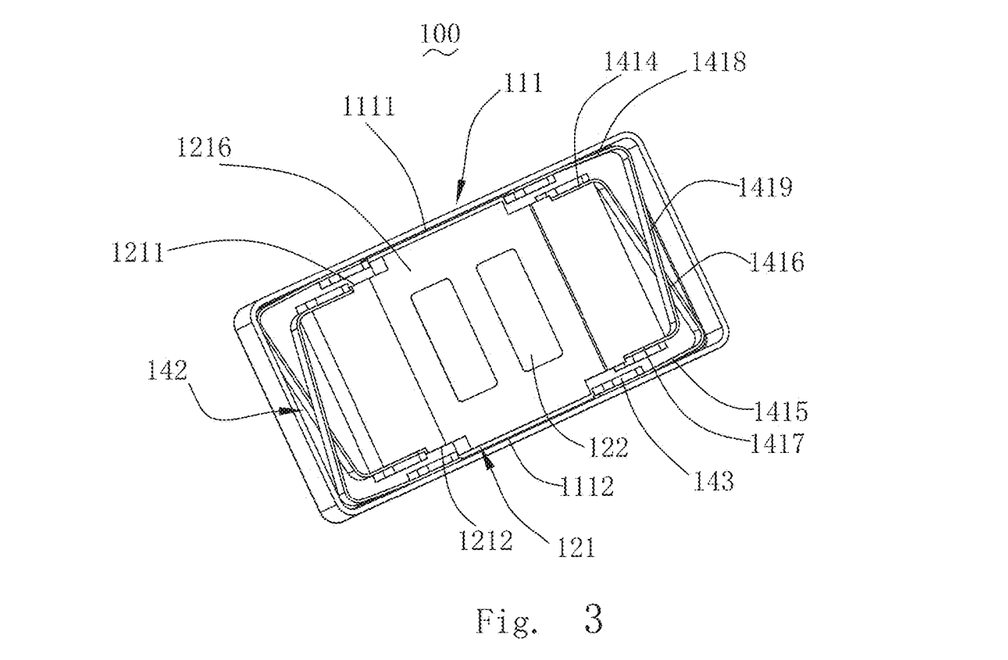
FIG. 3 is an isometric view of a part of the linear vibration motor in FIG. 1.
Figure 4:
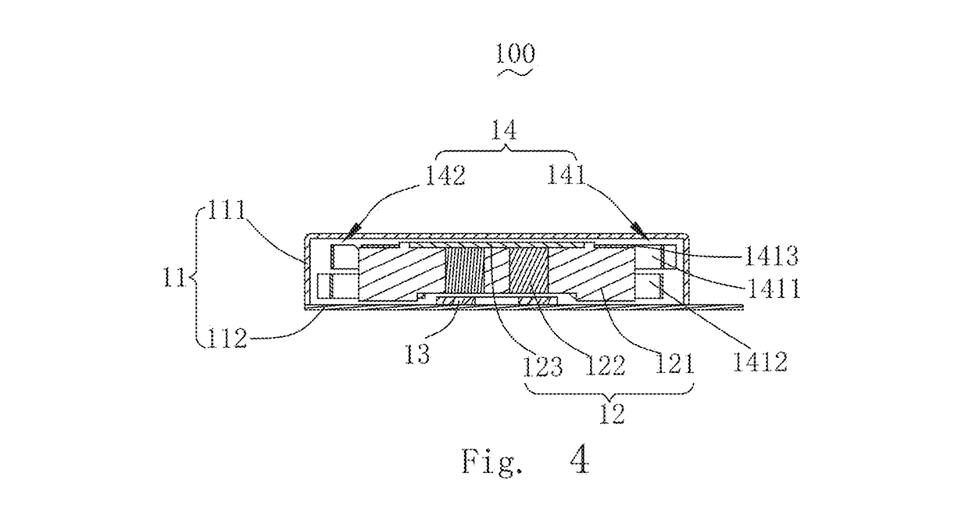
FIG. 4 is a cross-sectional view of the linear vibration motor taken along line A-A in FIG. 1.

Referring to FIGS. 1-4, a linear vibration motor 100 in accordance with a first exemplary embodiment of the present disclosure comprises a housing 11, a vibration unit 12 and a stator unit 13 accommodated in the housing 11, and an elastic piece 14 suspending the vibration unit 12 in the housing 11. For convenience of description, coordinate system of X, Y, Z axis is indicated in the figures, wherein X axis represents the vibration direction of the linear vibration motor 100, Y axis and Z axis represents the directions perpendicular to the vibration direction.

The housing 11 comprises an upper housing 111 and a lower housing 112 for cooperatively forming an accommodation space, the vibration unit 12. The stator unit 13 and the elastic piece 14 are accommodated in the accommodation space.

The vibration unit 12 comprises a mass block 121, a magnet 122 in an accommodation hole of the mass block 121, and a pole plate 123 covering the magnet 122.

The mass block 121 comprises a first side wall 1211 and a second side wall 1212 opposite to the first side wall 1211 along the vibration direction (X-axis direction), as well as a first surface 1215 and a second surface 1216 for connecting the first side wall 1211 and the second side wall 1212. The second surface 1216 is close to the stator unit 13, while the first surface 1215 is far away from the stator unit 13.

The upper housing 111 comprises a first inner wall 1111 and a second inner wall 1112 located on both sides of the vibration unit 12, the first side wall 1211 and the first inner wall 1111 are provided oppositely and spaced, the second side wall 1212 and the second inner wall 1112 are provided oppositely and spaced.

The stator unit 13 is a coil located below and keeping a distance from the magnet 122 for driving the vibration unit to vibrate.

The elastic piece 14 comprises a first elastic piece 141 and a second elastic piece 142 respectively provided at both sides of the vibration unit 12, a reinforcing piece 143 connecting with the first elastic piece 141 and the second elastic piece 142. The first elastic piece 141 and the second elastic piece 142 hold two opposite ends of the mass block 121 along the vibration direction respectively. The reinforcing piece 143 is used for reinforcing the connection of the first elastic piece 141 and the second elastic piece 142 with the vibration 12/housing 11. The first elastic piece 141 has a same structure as that of the second elastic piece 142 and both are molded integrally. To simplify the description, the following is detailed description of one of them.

The first elastic piece 141 comprises a first spring arm 1411, a second spring arm 1412 overlapped across the first spring arm 1411, a connection piece 1413 connecting the first spring arm 1411 with the second spring arm 1412.

The first spring arm 1411 comprises a first fixed section 1414 and a second fixed section 1415, a first connection section 1416 connecting the first fixed section 1414 with the second fixed section 1415.

The second spring arm 1412 comprises a third fixed section 1417 and a fourth fixed section 1418, a second connection section 1419 connecting the third fixed section 1417 with the fourth fixed section 1418.

Specifically, the first fixed section 1414 is connected with the first side wall 1211 of the mass block 121, the second fixed section 1415 is connected with the second inner wall 1112; the third fixed section 1417 is connected with the second side wall 1212 of the mass block 121, the fourth fixed part 1418 is connected with the first inner wall 1111 of the upper housing 11.

The first connection section 1416 is provided across the second connection section 1419, and surround the end of the mass block 121.

The connection piece 1413 connects the first fixed section 1414 and the third fixed section 1417, and the connection piece 1413 is fixedly connected with the first surface 1215.

The reinforcing piece 143 is provided at the first fixed section 1414, the second fixed section 1415, the third fixed section 1417, the fourth fixed section 1418, used for reinforcing the connection with the mass block 121/housing 11.

Embodiment II

Figure 5:
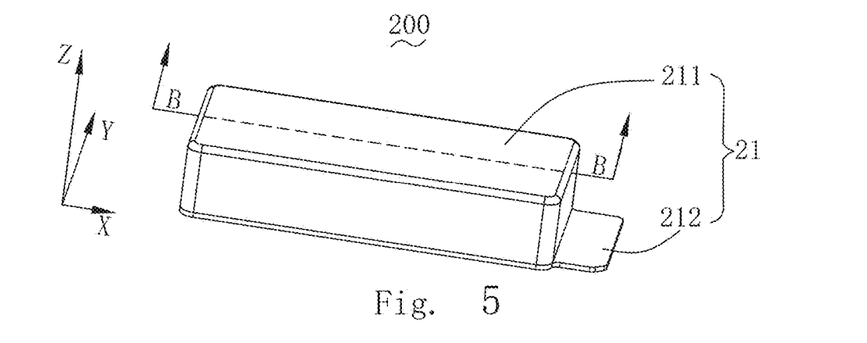
FIG. 5 is an isometric view of a linear vibration motor in accordance with a second exemplary embodiment of the present disclosure.
Figure 6:
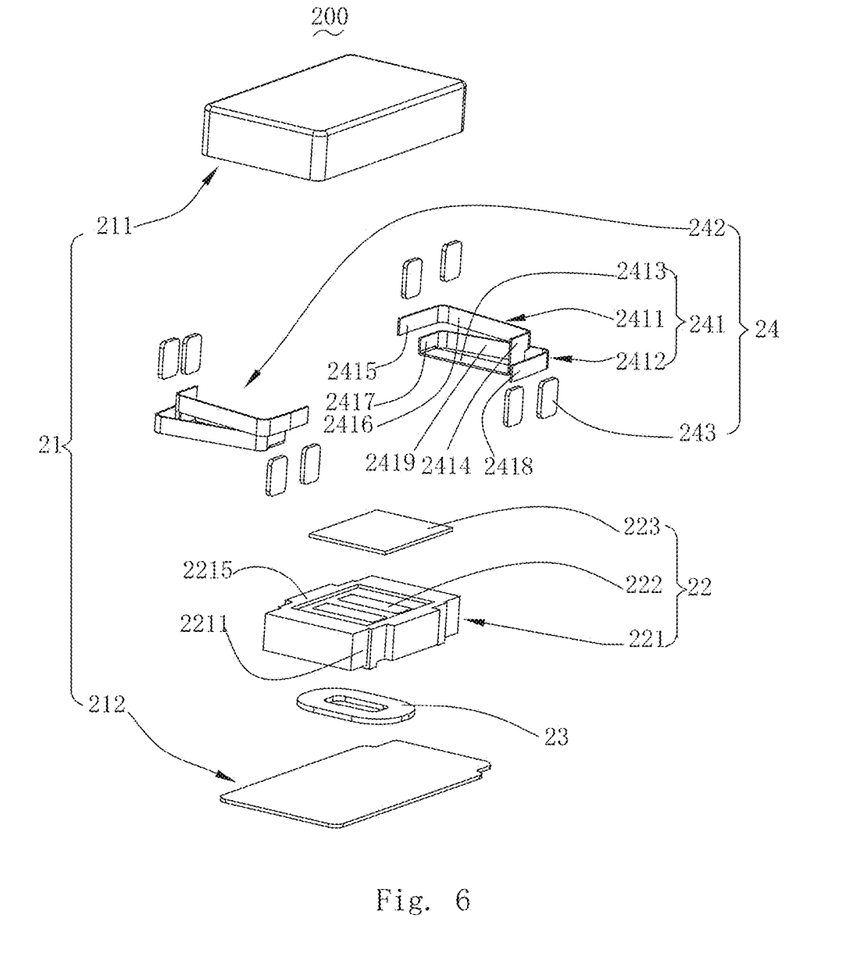
FIG. 6 is an exploded view of the linear vibration motor in FIG. 5.
Figure 7:
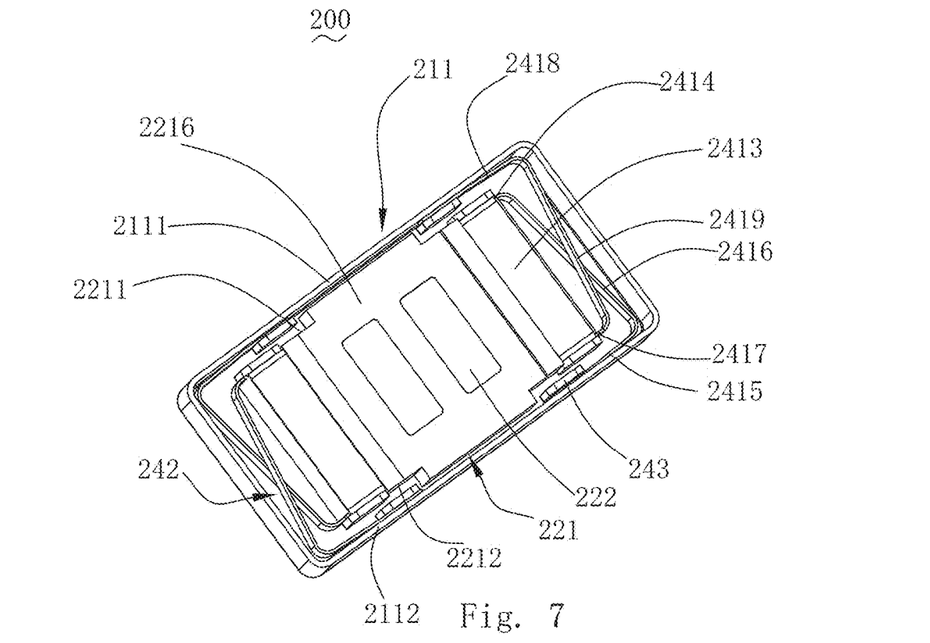
FIG. 7 is an isometric view of a part of the linear vibration motor in FIG. 5.
Figure 8:
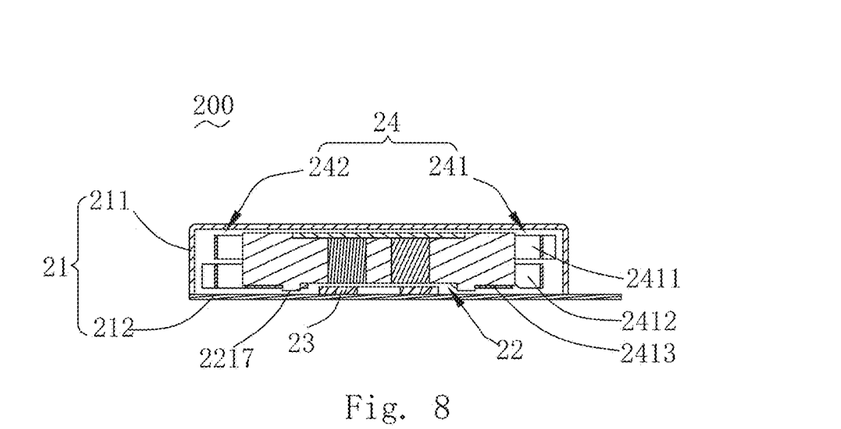
FIG. 8 is a cross-sectional view of the linear vibration motor taken along line B-B in FIG. 5.

Referring to FIGS. 5-8, a linear vibration motor 200 in accordance with a second exemplary embodiment of the present disclosure comprises a housing 21, a vibration unit 22 and a stator unit 23 accommodated in the housing 21, an elastic piece 24 suspending the vibration unit 22 in the housing 21. For convenience of description, coordinate system of X, Y, Z axis is indicated in the figures, wherein X axis represents the vibration direction of the linear vibration motor 200, Y axis and Z axis represents the directions perpendicular to the vibration direction.

The housing 21 comprises upper housing 211 and lower housing 212, positioned in a same relationship with other members as that in the first embodiment, and it's unnecessary to go into details here.

The vibration unit 22 and the stator unit 23 have a same structure as that in the first embodiment.

The vibration unit 22 comprises a mass block 221, a magnet 222 and a pole plate 223, all the three are positioned in a same relationship as that in the first embodiment. The mass block 221 comprises a first side wall 2211, a second side wall 2212, a first surface 2215, a second surface 2216 and an abutting wall 2217 provided at the second surface 2216, for the position relationships of the first side wall 2211, the second side wall 2212, the first surface 2215, the second surface 2216 with other members, please refer to the first embodiment.

The upper housing 211 comprises a first inner wall 2111 and a second inner wall 2112 located on both sides of the vibration unit 22, the first side wall 2211 and the first inner wall 2111 are provided oppositely and spaced, the second side wall 2212 and the second inner wall 2112 are provided oppositely and spaced.

The elastic member 24 comprises a first elastic member 241 and a second elastic member 242, a reinforcing member 243 provided at the first elastic member 241 and the second elastic member 242, the elastic member 24 is positioned in a same relationship with the vibration unit 22 as that in the first embodiment.

The first elastic piece 241 has a same structure as that of the second elastic piece 242 and both are molded integrally. To simplify the description, the following is detailed description of one of them.

The first elastic piece 241 comprises a first spring arm 2411, a second spring arm 2412 overlapped across the first spring arm 2411, a connection piece 2413 connecting the first spring arm 2411 with the second spring arm 2412. The first spring arm 2411, the second spring arm 2412 have the same shapes as and corresponding to that in the first embodiment.

The first spring arm 2411 comprises a first fixed section 2414, a second fixed section 2415, and a first connection section 2416 connecting the first fixed section 2414 with the second fixed section 2415. The first fixed section 2414, the second fixed section 2415 and the first connection. section 2416 have the same connection relationship with the vibration unit 22 and the housing 21 as that in the first embodiment, and it's unnecessary to go into details here.

The second spring arm 2412 comprises a third fixed section 2417, a fourth fixed section 2418, a second connection section 2419 connecting the third fixed section 2417 with the fourth fixed section 2418. The third fixed section 2417, the fourth fixed section 2418 and the second connection section 2419 have the same connection relationship with the vibration unit 22 and the housing 21 as that in the first embodiment, and it's unnecessary to go into details here.

What is different from the first embodiment is that the connection piece 2413 connects the first fixed section 2414 and the third fixed section 2417, and the connection piece 2413 is fixedly connected with the second surface 2216.

The connection piece 2413 abuts with the abutting wail 2217 to position the connection piece 2413, the distance from the abutting wall 2217 to the lower housing 112 is less than the distance from the coil 23 to the vibration unit 22.

Embodiment III

Figure 9:
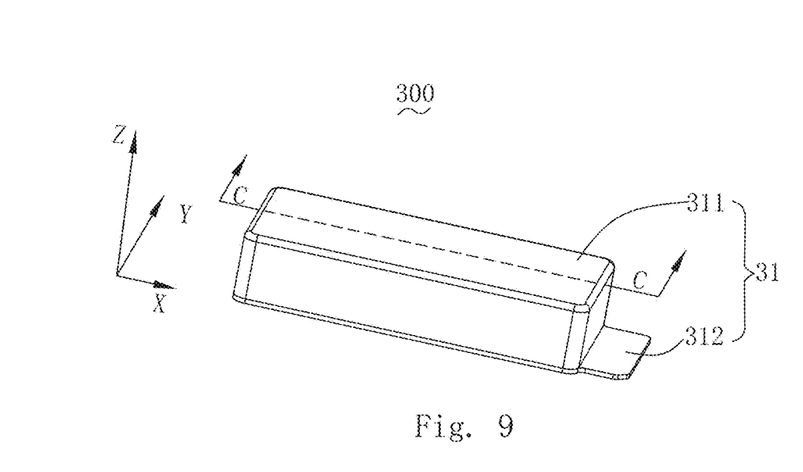
FIG. 9 is an isometric view of a linear vibration motor in accordance with a third exemplary embodiment of the present disclosure.
Figure 10:
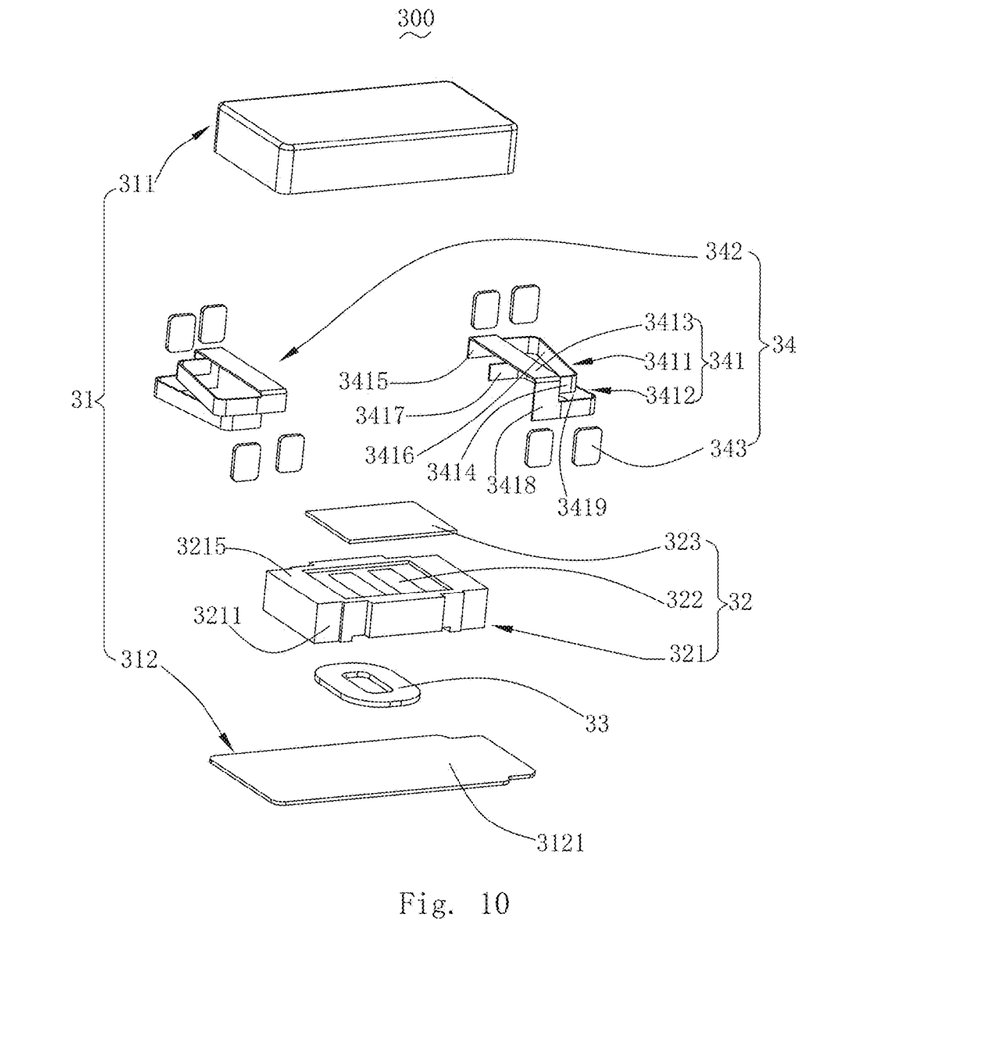
FIG. 10 is an exploded view of the linear vibration motor in FIG. 9.
Figure 11:
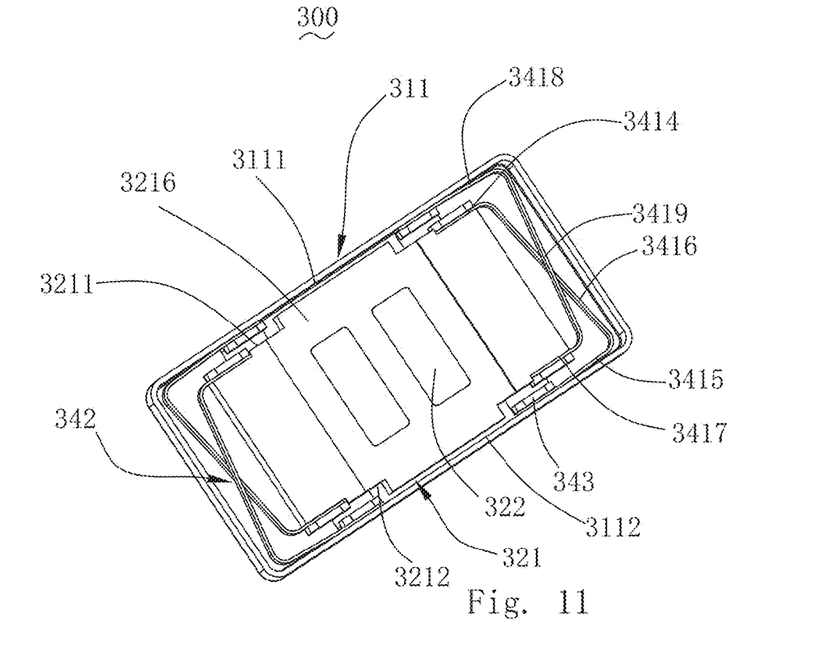
FIG. 11 is an isometric view of a part of the linear vibration motor in FIG. 9.
Figure 12:
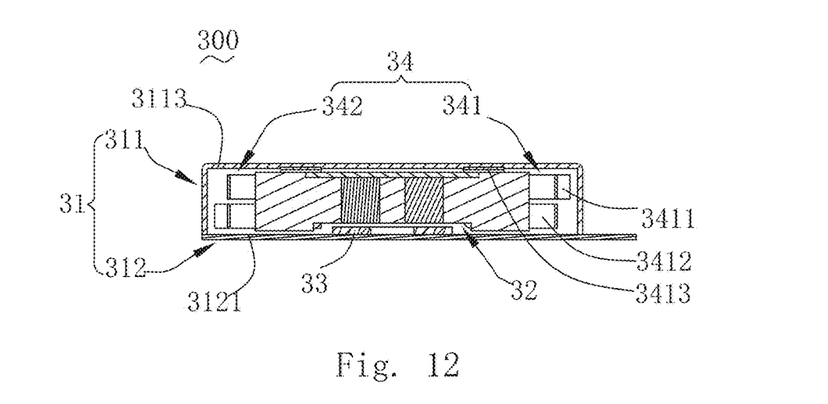
FIG. 12 is a cross-sectional view of the linear vibration motor taken along line C-C in FIG. 9.

Referring to FIGS. 9-12, a linear vibration motor 300 comprises a housing 31, a vibration unit 32 and a stator unit 33 accommodated in the housing 31, an elastic piece 34 suspending the vibration unit 32 in the housing 31. For convenience of description, coordinate system of X, Y, Z axis is indicated in the figures, wherein X axis represents the vibration direction of the linear vibration motor 300. Y axis and Z axis represents the directions perpendicular to the vibration direction.

The housing 31 comprises upper housing 311 and lower housing 312, the upper housing 311 comprises a first inner wall 3111 and a second inner wall 3112 on both sides of the vibration unit 32, a top wall 3113 connecting with the first inner wall 3111 and the second inner wall 3112. When the lower housing 312 and the upper housing 311 jointly enclose, the lower housing 312 is taken as a bottom wall 3121 provided opposite to the top wall 3113 for connecting the first inner wall 3111 and the second wall. 3112.

The vibration unit 32 and the stator unit 33 have a same structure as that in the first embodiment, and it's unnecessary to go into details here.

The vibration unit 32 comprises a mass block 321, a magnet 322 and a pole plate 323, all the three are positioned in a same relationship as that in the first embodiment. The mass block 321 comprises a first side wall 3211, a second side wall 3212, a first surface 3215 and a second surface 3216, the first surface 3215 is provided opposite to and spaced from the top wall 3113, the second surface 3216 is provided opposite to and spaced from the bottom wall 3121. The first side wall 3211, the second side wall 3212, the first surface 3215 and the second surface 3216 are positioned in a same relationship as the corresponding members in the first embodiment.

The elastic member 34 comprises a first elastic member 341 and a second elastic member 342, a reinforcing member 343 connecting with the first elastic member 341 and the second elastic member 342, the elastic member 34 is positioned in a same relationship with the vibration unit 22 as that in the first embodiment.

Similarly, the first elastic member 341 and the second elastic member 342 are molded integrally, the structure of the elastic member 34 is described in detail by taking the first elastic member 341 as an example.

The first elastic piece 341 comprises a first spring arm 3411, a second spring arm 3412 overlapped across the first spring arm 3411, a connection piece 3413 connecting the first spring arm 3411 with the second spring arm 3412. The first spring arm 3411, the second spring arm 3412 have the same shapes as and corresponding to that in the first embodiment.

The first spring arm 3411 comprises a first fixed section 3414, a second fixed section 3415, and a first connection section 3414 connecting the first fixed section 3415 with the second fixed section 3416. The first fixed section 3414, the second fixed section 3415 and the first connection section 3416 have the same connection relationship with the vibration unit 32 and the housing 31 as that in the first embodiment, and it's unnecessary to go into details here.

The second spring arm 3412 comprises a third fixed section 3417, a fourth fixed section 3418, a second connection section 3417 connecting the third fixed section 3418 with the fourth fixed section 3419. The third fixed section 3417, the fourth fixed section 3418 and the second connection section 3419 have the same connection relationship with the vibration unit 32 and the housing 31 as that in the first embodiment, and it's unnecessary to go into details here.

What is different from the first embodiment is that, the connection piece 3413 connects the second fixed section 3415 and the fourth fixed section 3418, and the connection piece 3413 is fixedly connected with the top wall 3113 of the upper housing 311.

Embodiment IV

Figure 13:
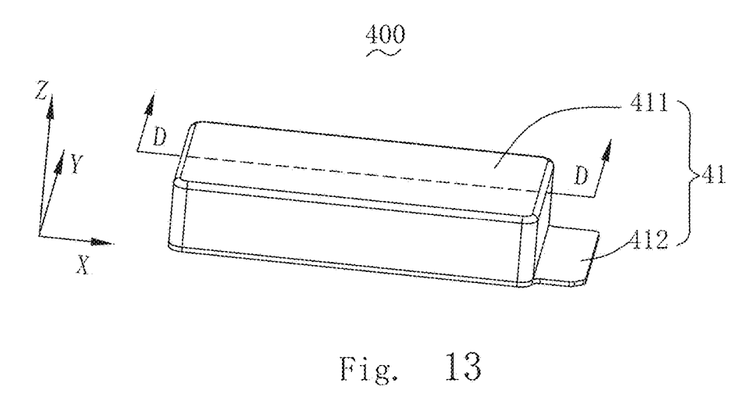
FIG. 13 is an isometric view of a linear vibration motor in accordance with a fourth exemplary embodiment of the present disclosure.
Figure 14:
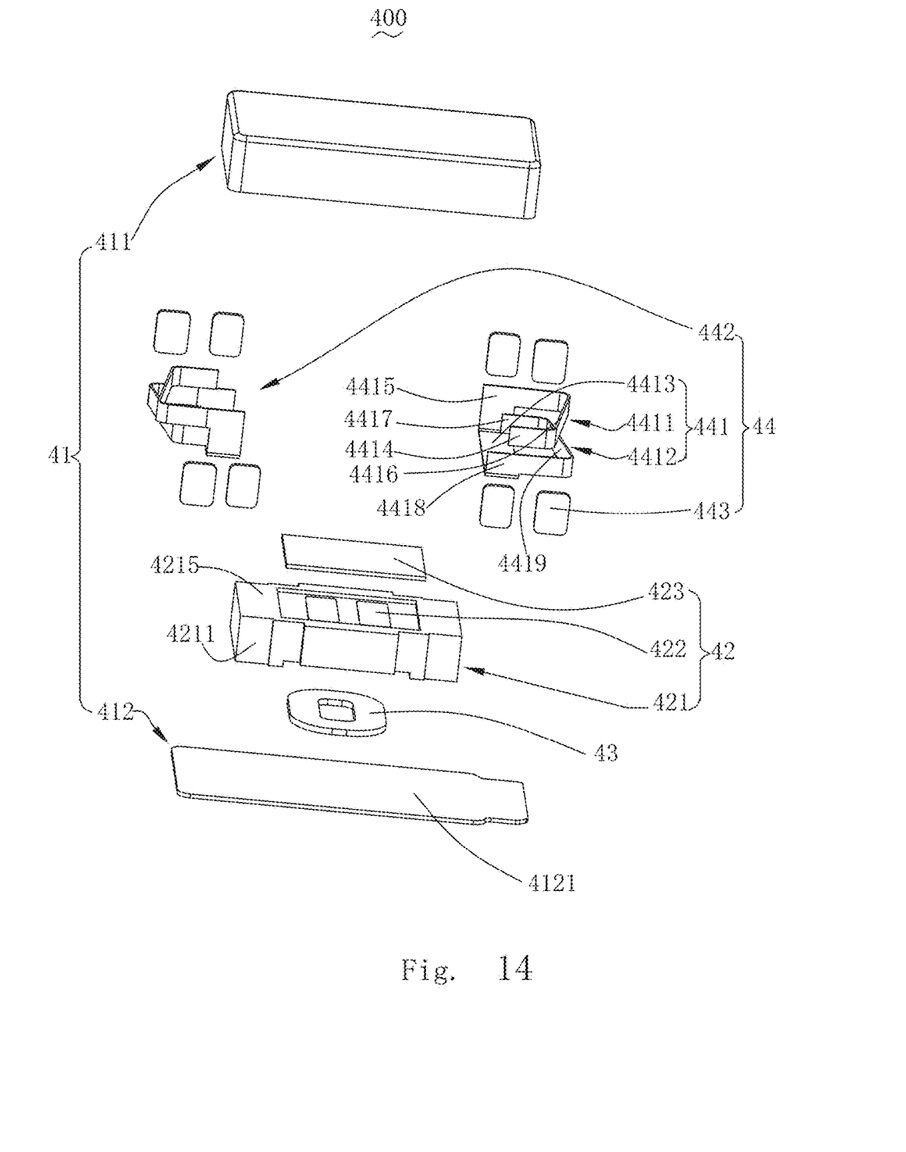
FIG. 14 is an exploded view of the linear vibration motor in FIG. 13.
Figure 15:
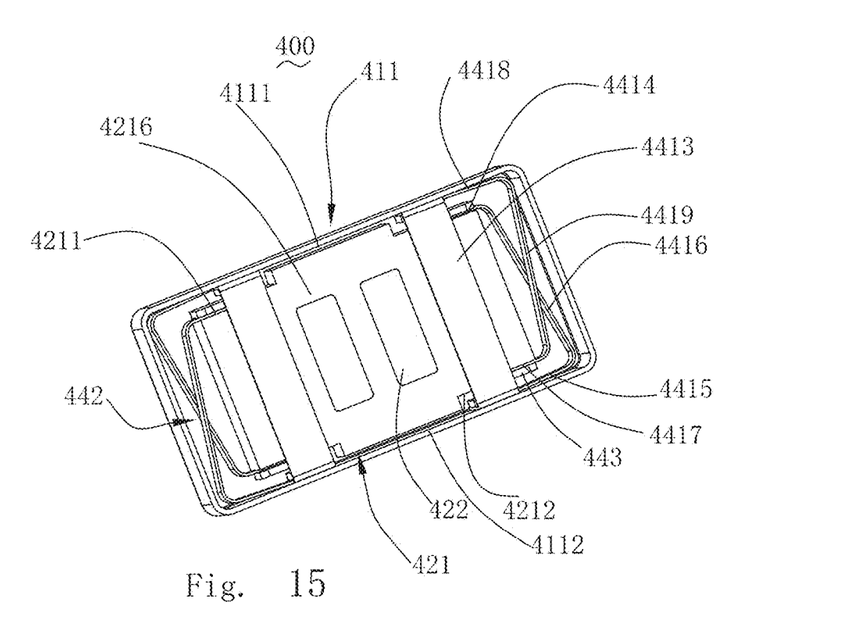
FIG. 15 is an isometric view of a part of the linear vibration motor in FIG. 13.
Figure 16:
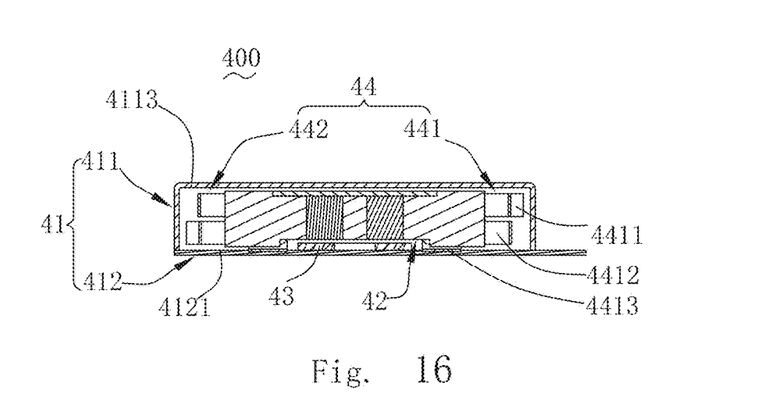
FIG. 16 is a cross-sectional view of the linear vibration motor taken along line D-D in FIG. 13.

Referring to FIGS. 13-16, a linear vibration motor 400 comprises a housing 41, a vibration unit 42 and a stator unit 43 accommodated in the housing 41, an elastic piece 44 suspending the vibration unit 42 in the housing 41. For convenience of description, coordinate system of X, Y, Z axis is indicated in the figures, wherein X axis represents the vibration direction of the linear vibration motor 400, Y axis and Z axis represents the directions perpendicular to the vibration direction.

The housing 41 comprises upper housing 411 and lower housing 412, the upper housing 411 comprises a first inner wall 4111 and a second inner wall 4112 on both sides of the vibration unit 42, a top wall 4113 connecting with the first inner wall 4111 and the second inner wall 4112. When the lower housing 412 and the upper housing 411 jointly enclose, the lower housing 412 is taken as a bottom wall 4121 provided opposite to the top wall 4113 for connecting the first inner wall 4111 and the second wall 4112.

The vibration unit 42 and the stator unit 43 have a same structure as that in the first embodiment, and it's unnecessary to go into details here.

The vibration unit 42 comprises a mass block 421, a magnet 422 and a pole plate 423, all the three are positioned in a same relationship as that in the first embodiment. The mass block 421 comprises a first side wall 4211, a second side wall 4212, a first surface 4215, a second surface 4216, The first side wall 4211, the second side wall 4212, the first surface 4215 and the second surface 4216 are positioned in a same relationship as the corresponding members in the first embodiment.

The elastic member 44 comprises a first elastic member 441 and a second elastic member 442, a reinforcing member 443 provided at the first elastic member 441 and the second elastic member 442, the elastic member 44 is positioned in the same relationship with the vibration unit 42 as that in the first embodiment.

Similarly, the structure of the elastic member 44 is described in detail by taking the first elastic member 441 as an example.

The first elastic piece 441 comprises a first spring arni 4411, a second spring arm 4412 overlapped across the first spring arm 4411, a connection piece 4413 connecting the first spring arm 4411 with the second spring arm 4412. The first spring arm 4411, the second spring arm 4412 have the same shapes as and corresponding to that in the first embodiment.

The first spring arm 4411 comprises a first fixed section 4414, a second fixed section 4415, and a first connection section 4416 connecting the first fixed section 4414 with the second fixed section 4415. The first fixed section 4414, the second fixed section 4415 and the first connection section 4416 have the same connection relationship with the vibration unit 42 and the housing 41 as that in the first embodiment, and it's unnecessary to go into details here.

The second spring arm 4412 comprises a third fixed section 4417, a fourth fixed section 4418, a second connection section 4419 connecting the third fixed section 4417 with the fourth fixed section 4418. The third fixed section 4417 the fourth fixed section 4418 and the second connection section 4419 have the same connection relationship with the vibration unit 42 and the housing 41 as that in the first embodiment, and ifs unnecessary to go into details here.

What's different from the first embodiment is that, the connection piece 4413 connects the second fixed section 4415 with the fourth fixed section 4418, and the connection piece 4413 is fixedly connected with the second surface 4121.

The present disclosure has the following beneficial effects compared with the related art: The elastic member of the linear vibration motor provided by the present disclosure comprises the first elastic member and the second elastic member, and both the first elastic member and the second elastic member comprises the first elastic arm and the second elastic arm provided across each other, the connection piece connecting the first elastic arm and the second elastic arm into a integrity, such a structure design of the elastic piece ensures the integrity of the first elastic member and the second elastic member, effectively increase the support intensity of the first elastic piece and the second elastic piece on Z axis, and the vibration unit has no shift on Y axis during vibration, the first elastic piece and the second elastic piece are molded integrally, easy for processing and convenient for assembly.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
   a vibration unit including a first side wall and a second side wall opposed to the first side wall along a vibration direction;
   a housing with an accommodation space for accommodating the vibration unit, the housing having a first inner wall opposed to the first side wall and a second inner wall opposed to the second side wall respectively provided on two sides of the vibration unit;
   a stator unit accommodated in the accommodation space;
   an elastic piece suspending the vibration unit in the accommodation space, the elastic piece including a first elastic member and a second elastic member located on two opposed ends of the vibration unit, each of the first and second elastic members including a first spring arm and a second spring arm overlapped across each other;
   wherein
   the first spring arm comprises a first fixed section connected with the first side wall, a second fixed section connected with the second inner wall, and a first connection section connecting the first fixed section to the second fixed section, the second spring arm comprises a third fixed section connecting with the second side wall, a four fixed section connecting with the first inner wall, and a second connection section connecting the third fixed section to the four fixed section, the first connection section and the second connection section are arranged to across each other, both the first elastic member and the second elastic member comprise a connection piece connecting with the first fixed section and the third fixed section for abutting against the vibration unit.

2. The linear vibration motor as described in claim 1, wherein the vibration unit comprises a first surface and a second surface opposite to the first surface for connecting the first side wall and the second side wall, the connection piece abuts against the first surface and the second surface.

3. The linear vibration motor as described in claim 1, wherein each of the first elastic piece and the second elastic piece is integrally formed.

4. The linear vibration motor as described in claim 2, wherein the vibration unit is provided with an abutting wall for positioning and mounting the connection piece, the connection piece abuts against the abutting wall.

5. The linear vibration motor as described in claim 4, wherein the stator unit is a coil, the abutting wall is disposed on one side of the coil, a distance from the abutting wall to the housing is less than a distance from the coil to the vibration unit.

6. A linear vibration motor comprising:
   a housing with an accommodation space, a vibration unit and a stator unit accommodated in the housing, an elastic piece suspending the vibration unit in the accommodation space, the vibration unit comprises a first side wall and a second side wall provided oppositely and spaced along its vibration direction, the housing comprise a first inner wall and a second inner wall respectively provided on both sides of the vibration unit, wherein, the first inner wall and the first side wall are provided oppositely and spaced, the second inner wall and the second side wall are provided oppositely and spaced, which is characterized in that, both the elastic piece and the second elastic member comprises a first spring arm and a second spring arm overlapped across each other, the first spring arm comprises a first fixed section connected with the first side wall and a second fixed section connected with the second inner wall, a first connection section connecting with the first fixed section and the second fixed section, the second spring arm comprises a third fixed section connecting with the second side wall and a four fixed section connecting with the first inner wall, a second connection section connecting with the third fixed section and the four fixed section, the first connection section and the second connection section are provided across each other, both the first elastic member and the second elastic member comprises a connection piece connecting with the first fixed section and the third fixed section, the connection piece abuts with the housing.

7. The linear vibration motor as described in claim 6, wherein the housing comprises a top wall and a bottom wall opposite to the top wall for connecting the first inner wall and the second inner wall, the connection piece abuts with the top wall or bottom wall.

* * * * *